United States Patent
Yoshikawa et al.

(10) Patent No.: US 10,044,036 B2
(45) Date of Patent: Aug. 7, 2018

(54) POSITIVE ACTIVE MATERIAL FOR LITHIUM SECONDARY BATTERY, ELECTRODE FOR LITHIUM SECONDARY BATTERY AND LITHIUM SECONDARY BATTERY

(71) Applicant: GS Yuasa International Ltd., Kyoto-shi, Kyoto (JP)

(72) Inventors: Daisuke Yoshikawa, Kyoto (JP); Daisuke Endo, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 101 days.

(21) Appl. No.: 15/100,479

(22) PCT Filed: Nov. 17, 2014

(86) PCT No.: PCT/JP2014/005754
§ 371 (c)(1),
(2) Date: May 31, 2016

(87) PCT Pub. No.: WO2015/083330
PCT Pub. Date: Jun. 11, 2015

(65) Prior Publication Data
US 2016/0301073 A1 Oct. 13, 2016

(30) Foreign Application Priority Data
Dec. 2, 2013 (JP) .................................. 2013-249361

(51) Int. Cl.
*H01B 1/08* (2006.01)
*H01M 4/525* (2010.01)
(Continued)

(52) U.S. Cl.
CPC .......... *H01M 4/525* (2013.01); *C01G 53/006* (2013.01); *C01G 53/50* (2013.01); *H01B 1/08* (2013.01);
(Continued)

(58) Field of Classification Search
CPC ... C01G 53/006; C01G 53/50; C01P 2002/50; C01P 2002/52; C01P 2002/74;
(Continued)

(56) References Cited

U.S. PATENT DOCUMENTS

| 8,137,847 B2 | 3/2012 | Yoshizawa |
| 2009/0011335 A1 | 1/2009 | Saito |

(Continued)

FOREIGN PATENT DOCUMENTS

| JP | 2009004285 A2 | 1/2009 |
| JP | 2012185913 A2 | 9/2012 |

(Continued)

OTHER PUBLICATIONS

International Search Report dated Dec. 9, 2014 filed in PCT/JP2014/005754.

*Primary Examiner* — Mark T Kopec
*Assistant Examiner* — Jaison P Thomas
(74) *Attorney, Agent, or Firm* — Ranklin, Hill & Clark LLP (57) ABSTRACT

Provided is a positive active material for a lithium secondary battery containing a lithium transition metal composite oxide. The lithium transition metal composite oxide has an α-NaFeO₂ structure. A transition metal (Me) includes Co, Ni and Mn and a molar ratio Li/Me of lithium (Li) to the transition metal is larger than 1.2 and smaller than 1.6. The lithium transition metal composite oxide has a pore volume of 0.055 to 0.08 cc/g in a pore region in which a pore size, at which a differential pore volume determined by a BJH (Continued)

method from an adsorption isotherm using a nitrogen gas adsorption method exhibits a maximum value, is within a range up to 60 nm, and exhibits a single phase belonging to a space group R3-m at 1000° C.

13 Claims, 2 Drawing Sheets (51) Int. Cl.
H01M 4/505 (2010.01)
C01G 53/00 (2006.01)
H01M 4/131 (2010.01)
H01M 10/0525 (2010.01)
H01M 10/052 (2010.01)
H01M 4/02 (2006.01)

(52) U.S. Cl.
CPC ......... H01M 4/131 (2013.01); H01M 4/505 (2013.01); H01M 10/0525 (2013.01); C01P 2002/50 (2013.01); C01P 2002/52 (2013.01); C01P 2002/74 (2013.01); C01P 2004/32 (2013.01); C01P 2006/11 (2013.01); C01P 2006/14 (2013.01); C01P 2006/16 (2013.01); H01M 10/052 (2013.01); H01M 2004/028 (2013.01)

(58) Field of Classification Search
CPC .......... C01P 2004/32; C01P 2006/11; C01P 2006/14; C01P 2006/16; H01M 10/052; H01M 10/0525; H01M 2004/028; H01M 4/131; H01M 4/505; H01M 4/525; H01B 1/08

See application file for complete search history.

(56) References Cited

U.S. PATENT DOCUMENTS

| | | | |
|---|---|---|---|
| 2013/0313471 A1* | 11/2013 | Endo | C01G 53/50 252/182.1 |
| 2014/0038053 A1* | 2/2014 | Endo | H01M 4/0471 429/223 |
| 2014/0227594 A1 | 8/2014 | Kim | |
| 2014/0242463 A1 | 8/2014 | Kim | |
| 2014/0306151 A1* | 10/2014 | Endo | H01M 4/505 252/182.1 |
| 2014/0356712 A1 | 12/2014 | Kim | |

FOREIGN PATENT DOCUMENTS

| | | |
|---|---|---|
| JP | 2012195082 A2 | 10/2012 |
| JP | 2012234772 A2 | 11/2012 |
| JP | 2014044928 A2 | 3/2014 |
| JP | 2014049239 A2 | 3/2014 |
| WO | 2008126370 A1 | 10/2008 |
| WO | 2012091015 A1 | 7/2012 |
| WO | 2013048047 A2 | 4/2013 |
| WO | 2013048048 A2 | 4/2013 |
| WO | 2013048071 A2 | 4/2013 |
| WO | 2013084923 A1 | 6/2013 |

* cited by examiner

POSITIVE ACTIVE MATERIAL FOR LITHIUM SECONDARY BATTERY, ELECTRODE FOR LITHIUM SECONDARY BATTERY AND LITHIUM SECONDARY BATTERY

TECHNICAL FIELD

The present invention relates to a positive active material for a lithium secondary battery containing an inventive lithium transition metal composite oxide, an electrode for a lithium secondary battery containing the positive active material, and a lithium secondary battery including the electrode.

BACKGROUND ART

Currently, nonaqueous electrolyte secondary batteries typified by lithium ion secondary batteries, particularly lithium secondary batteries, are widely mounted on portable terminals, and the like. For these nonaqueous electrolyte secondary batteries, mainly $LiCoO_2$ is used as a positive active material. However, the discharge capacity of $LiCoO_2$ is about 120 to 130 mAh/g.

Further, as a material of a positive active material for a lithium secondary battery, solid solutions of $LiCoO_2$ and other compounds are known. $Li[Co_{1-2x}Ni_xMn_x]O_2$ ($0<x\leq\frac{1}{2}$), a solid solution having an $\alpha$-$NaFeO_2$ type crystal structure and formed of three components: $LiCoO_2$, $LiNiO_2$ and $LiMnO_2$, has been published in 2001. $LiNi_{1/2}Mn_{1/2}O_2$ or $LiCo_{1/3}Ni_{1/3}Mn_{1/3}O_2$ that is one example of the aforementioned solid solution has a discharge capacity of 150 to 180 mAh/g, and is also excellent in terms of charge-discharge cycle performance.

In contrast with so called a "$LiMeO_2$-type" active material as described above, so called a "lithium-excess-type" active material is known in which the composition ratio Li/Me of lithium (Li) to the ratio of a transition metal (Me) is larger than 1, with Li/Me being, for example, 1.25 to 1.6 (see, for example, Patent Document 1 and Patent Document 2). This material can be represented by $Li_{1+\alpha}Me_{1-\alpha}O_2$ ($\alpha>0$). Here, $\beta=(1+\alpha)/(1-\alpha)$ when the composition ratio Li/Me of lithium (Li) to the ratio of a transition metal (Me) is $\beta$, and therefore, for example, $\alpha=0.2$ when Li/Me is 1.5.

Patent Documents 1 and 2 disclose active materials as described above. Further, these Patent Documents describe that a battery capable of attaining a discharge capacity of 200 mAh/g or more can be produced even when a charge method in which a maximum achievable potential of the positive electrode at the time of charge is 4.3 V (vs. Li/Li$^+$) or less or less than 4.4 V (vs. Li/Li$^+$) is employed at the point of use. The battery can be produced by providing, as a production method of a battery including the active material, a production step of performing charging at least up to a region which appears in a positive electrode potential range of more than 4.3 V (vs. Li/Li$^+$) and 4.8 V (vs. Li/Li$^+$) or less and is relatively flat in a potential.

As described above, as distinct from the case of the so-called "$LiMeO_2$ type" positive active material, the so-called "lithium-excess-type" positive active material is characterized in that a large discharge capacity is obtained by performing charge to a relatively high potential exceeding 4.3 V, particularly up to a potential of 4.4 V or more, at least at the first charge.

Further, it is known that by extracting part of Li by acid treatment of the "lithium-excess-type" positive active material, initial efficiency is improved as well as a capacity and cycle performance are also improved (e.g., Patent Documents 3 to 6).

Patent Document 3 describes "A method for producing a positive active material which obtains a positive active material from a lithium-containing oxide comprising a step of treating the lithium-containing oxide with an acid aqueous solution, wherein the lithium-containing oxide includes $Li_{1+x}(Mn_yM_{1-y})_{1-x}O_2$ ($0<x<0.4$, $0<y\leq1$), the M includes at least one kind of transition metal excluding manganese, and the amount of hydrogen ions in the acid aqueous solution is x mol or more and less than 5x mol with respect to 1 mol of the lithium-containing oxide" (claim 5). Patent Document 3 further describes that an object of the invention is "to provide a positive active material having a high capacity and a method for producing a positive active material which enable excellent load performance and high initial charge-discharge efficiency of a nonaqueous electrolyte secondary battery" (paragraph [0009]).

Patent Document 4 describes "The positive electrode for a lithium ion secondary battery according to claim 1 or 2, wherein the positive active material is represented by a general formula (2): $Li_{2-0.5x}Mn_{1-x}M_{1.5x}O_3$ ... (2), in which Li represents lithium, Mn represents manganese, M represents $Ni_\alpha Co_\beta Mn_\gamma$ (Ni indicates nickel, Co indicates cobalt, Mn indicates manganese, and $\alpha$, $\beta$ and $\gamma$ satisfy $0<\alpha\leq0.5$, $0\leq\beta\leq0.33$, and $0<\gamma\leq0.5$), and x satisfies a relationship of $0<x<1.00$, and the positive active material is obtained by immersing a layered transition metal oxide whose crystal structure belongs to a space group C2/m in an acidic solution" (claim 3). Patent Document 4 further describes that an object of the invention is "to provide a positive active material for a lithium ion secondary battery capable of exerting excellent initial charge-discharge efficiency, and a positive electrode for a lithium ion secondary battery and a lithium ion secondary battery including the positive active material" (paragraph [0008]).

Patent Document 5 describes "A method for producing a positive active material for a lithium ion secondary battery comprising an acid treatment step of bringing an acid solution into contact with an active material represented by a compositional formula: $xLi_2M^1O_3\cdot(1-x)$ $LiM^2O_2$ ($M^1$ is one or more kinds of metal elements containing tetravalent manganese as an essential element, $M^2$ is one or more kinds of metal elements, $0<x\leq1$, and Li may be partially substituted with hydrogen); and a lithium compensation step of bringing a lithium solution containing a lithium compound into contact with the acid-treated active material" (claim 1). Patent Document 5 describes "The method for producing a positive active material for a lithium ion secondary battery according to claim 1, wherein the acid solution is formed of any one of a sulfuric acid aqueous solution, a nitric acid aqueous solution and an aqueous ammonium sulfate solution" (claim 2). Patent Document 5 further describes that an object of the invention is "to provide a method for producing a positive active material for a lithium ion secondary battery capable of suppressing a reduction of a battery capacity due to activation of a positive active material" (paragraph [0011]).

Patent Document 6 describes "A lithium transition metal-based compound powder for a lithium secondary battery positive material, wherein the lithium transition metal-based compound powder is an oxide represented by a general formula (1) and has Li holes and oxygen holes in its crystal structure, and root-mean-square roughness (RMS) of a primary particle surface specified according to JIS B 0601 (2001) is 1.5 nm or less, xLi$_2$MO$_3$·(1-x) LiNO$_2$ ... (1) (x is a number satisfying 0<x<1, M is one or more kinds of metal elements with an average oxidation number of 4$^+$, and N is one or more kinds of metal elements with an average oxidation number of 3$^+$)" (claim 1). Patent Document 6 describes "The lithium transition metal-based compound powder for a lithium secondary battery positive material according to claim 1, wherein the lithium transition metal-based compound powder is formed of a compound obtained by performing heating treatment in a solvent with a pH$^3$ of 5 and then performing heat treatment at a temperature of 200° C. or higher and 900° C. or lower for 24 hours or less" (claim 2). Patent Document 6 further describes that an object of the invention is "to provide a positive material for a lithium secondary battery and a positive electrode for a lithium secondary battery which can provide a lithium secondary battery having high initial efficiency and excellent rate performance, and a lithium secondary battery including the positive material and the positive electrode" (paragraph [0010]).

PRIOR ART DOCUMENTS

Patent Documents

Patent Document 1: WO 2012/091015
Patent Document 2: WO 2013/084923
Patent Document 3: JP-A-2009-004285
Patent Document 4: JP-A-2012-185913
Patent Document 5: JP-A-2012-195082
Patent Document 6: JP-A-2012-234772

DISCLOSURE OF THE INVENTION

Problems to be Solved by the Invention

In recent years, a positive active material which has not only a large discharge capacity, but also excellent initial efficiency and high rate discharge performance is required of a lithium secondary battery used in the field of automobiles such as electric automobiles, hybrid automobiles and plug-in hybrid automobiles.

The present invention has been made in view of the above-mentioned issue, and an object of the present invention is to provide a positive active material for a lithium secondary battery which has high initial efficiency and excellent high rate discharge performance, and a lithium secondary battery including the positive active material.

Means for Solving the Problems

The present invention pertains to a positive active material for a lithium secondary battery containing a lithium transition metal composite oxide, wherein the lithium transition metal composite oxide has an α-NaFeO$_2$ structure, a transition metal (Me) includes Co, Ni and Mn and a molar ratio Li/Me of lithium (Li) to the transition metal is larger than 1.2 and smaller than 1.6, and the lithium transition metal composite oxide has a pore volume of 0.055 to 0.08 cc/g in a pore region where a pore size, at which a differential pore volume determined by a BJH (Barrett-Joyner-Halenda) method from an adsorption isotherm using a nitrogen gas adsorption method exhibits a maximum value, is within a range up to 60 nm and exhibits a single phase belonging to a space group R3-m at 1000° C.

Advantages of the Invention

According to the present invention, it is possible to provide a positive active material capable of forming a lithium secondary battery having high initial efficiency and excellent high rate discharge performance. Also, it is possible to provide a lithium secondary battery including the positive active material.

MODE FOR CARRYING OUT THE INVENTION

The discharge capacity of the aforementioned so-called "lithium-excess type" positive active material is generally larger than that of the so-called "LiMeO$_2$-type" active material; however, it is known that the initial efficiency is low and high rate discharge performance is low. With respect to the initial efficiency of these problems, it is publicly known that the initial efficiency is improved by subjecting the active material to acid treatment as described in Patent Documents 3 to 5. In recent years, a positive active material which has not only a large discharge capacity, but also excellent initial efficiency and high rate discharge performance is required of a lithium secondary battery used in the field of automobiles such as electric automobiles, hybrid automobiles and plug-in hybrid automobiles. Incidentally, Patent Document 6 describes to improve the initial efficiency and the high rate discharge performance but does not describe to perform acid treatment.

The present invention has been made in view of the above-mentioned problem, and an object of the present invention is to provide a positive active material for a lithium secondary battery which has high initial efficiency and excellent high rate discharge performance, and a lithium secondary battery including the positive active material.

In the present invention, in order to solve the aforementioned problem, the following means are employed.

(1) A positive active material for a lithium secondary battery containing a lithium transition metal composite oxide, wherein the lithium transition metal composite oxide has an α-NaFeO$_2$ structure, a transition metal (Me) includes Co, Ni and Mn and a molar ratio Li/Me of lithium (Li) to the transition metal is larger than 1.2 and smaller than 1.6, and the lithium transition metal composite oxide has a pore volume of 0.055 to 0.08 cc/g in a pore region where a pore size, at which a differential pore volume determined by a BJH method from an adsorption isotherm using a nitrogen gas adsorption method exhibits a maximum value, is within a range up to 60 nm, and exhibits a single phase belonging to a space group R3-m at 1000° C.

(2) The positive active material for a lithium secondary battery according to the above (1), wherein in the lithium transition metal composite oxide, a half width of the diffraction peak belonging to the (003) plane in X-ray diffraction measurement is within a range of 0.202° to 0.265°.

(3) The positive active material for a lithium secondary battery according to the above (1) or (2), wherein a molar ratio of Mn to the transition metal element Me (Mn/Me) is 0.5 or more.

(4) The positive active material for a lithium secondary battery according to the above (1) or (2), wherein a molar ratio of Mn to the transition metal element Me (Mn/Me) is 0.5 or more and 0.75 or less.

(5) The positive active material for a lithium secondary battery according to any one of the above (1) to (4), wherein a molar ratio of Co to the transition metal element Me (Co/Me) is 0.05 or more and 0.40 or less.

(6) The positive active material for a lithium secondary battery according to any one of the above (1) to (4), wherein a molar ratio of Co to the transition metal element Me (Co/Me) is 0.10 or more and 0.30 or less.

(7) An electrode for a lithium secondary battery containing the positive active material for a lithium secondary battery according to any one of the above (1) to (6).

(8) A lithium secondary battery comprising the electrode for a lithium secondary battery according to the above (7).

(9) A method for producing the positive active material for a lithium secondary battery according to any one of the above (1) to (6), wherein the lithium transition metal composite oxide is prepared by undergoing a precursor preparation step of preparing a precursor containing Co, Ni and Mn as transition metal elements; a calcination step of mixing the precursor and a Li salt and heat-treating the resulting mixture at a temperature of 800° C. or higher to prepare an oxide; and an acid treatment step of acid-treating the oxide.

(10) The method for producing the positive active material for a lithium secondary battery according to the above (9), wherein the precursor is a carbonate compound.

(11) The method for producing the positive active material for a lithium secondary battery according to the above (9), wherein the precursor preparation step includes a step of coprecipitating a carbonate from an aqueous solution with a pH of 7.5 to 11 including Co, Ni and Mn.

(12) The method for producing the positive active material for a lithium secondary battery according to the above (10) or (11), wherein in the calcination step, heat treatment is performed at a temperature of 800° C. or higher and 900° C. or lower.

(13) The method for producing the positive active material for a lithium secondary battery according to any one of the above (9) to (12), wherein in the acid treatment step, sulfuric acid is used.

The present inventors found that both characteristics of initial efficiency and high rate discharge performance are improved by chemically treating (treating with sulfuric acid) a "lithium-excess-type" active material (lithium transition metal composite oxide) prepared from a carbonate precursor under appropriate conditions, and these findings have lead to completion of the present invention. The aforementioned effects can be recognized in terms of thermal stability, porosity and crystallinity of a lithium transition metal composite oxide after acid treatment. Specifically, as described in the above (1) and (2), an active material which exerts the aforementioned effects is obtained by identifying a Li/Me ratio, a half width and a pore volume of the lithium transition metal composite oxide, and verifying retention of a crystal structure in heat-treating the active material at 1000° C.

The technical reason why these effects are achieved is supposed that robustness of a crystal which has an effect on insertion/extraction of lithium ions in the active material and diffusion of an electrolyte solution by porosity (pore volume) are improved.

The composition of the lithium transition metal composite oxide contained in the positive active material for a lithium secondary battery according to the present invention is, from the viewpoint of obtaining a large discharge capacity, composition of so-called "lithium-excess-type" in which a transition metal (Me) includes Co, Ni and Mn and a molar ratio Li/Me of lithium (Li) to the transition metal element is larger than 1.2 and which can be denoted by $Li_{1+\alpha}Me_{1-\alpha}O_2$ $((1+\alpha)/(1-\alpha)>1.2)$ as a typical example.

In the present invention, in order to attain a lithium secondary battery having high initial efficiency and excellent high rate discharge performance, a molar ratio of Li to the transition metal element Me (Li/Me) is preferably set to a value larger than 1.2 and smaller than 1.6, that is, it is preferred that in the compositional formula $Li_{1+\alpha}Me_{1-\alpha}O_2$, $\alpha$ satisfies an inequality $1.2<(1+\alpha)/(1-\alpha)<1.6$. Particularly, it is preferred to select the lithium transition metal composite oxide having the Li/Me of 1.25 to 1.5 in terms of the fact that a lithium secondary battery having a particularly large discharge capacity, high initial efficiency and excellent high rate discharge performance can be attained. Incidentally, in the present invention, the molar ratio Li/Me refers to a molar ratio Li/Me after acid treatment, and a molar ratio Li/Me in the starting material before the acid treatment is slightly higher than this.

In the present invention, in order to improve the initial efficiency and the high rate discharge performance of the lithium secondary battery, a molar ratio of Co to the transition metal element Me (Co/Me) is preferably set to 0.05 to 0.40, and more preferably 0.10 to 0.30.

Further, in order to improve the initial efficiency and the high rate discharge performance of the lithium secondary battery, a molar ratio of Mn to the transition metal element Me (Mn/Me) is preferably 0.5 or more. In the so-called "$LiMeO_2$ type" active material, when the molar ratio Mn/Me is set to 0.5 or more, a structure of the active material is changed to a spinel-type by charging and becomes an active material not having a structure belonging to the $\alpha$-$NaFeO_2$ structure, and therefore there arises a problem if the active material is used as an active material for a lithium secondary battery. On the other hand, in "lithium-excess-type" active material, since the $\alpha$-$NaFeO_2$ structure can be maintained even when charge is performed setting the molar ratio Mn/Me to 0.5 or more, a constitution that the molar ratio Mn/Me is 0.5 or more characterizes the so-called "lithium-excess-type" active material. The molar ratio Mn/Me is more preferably 0.5 or more and 0.75 or less.

The lithium transition metal composite oxide according to the present invention is represented by a general formula $Li_{1+\alpha}(Co_aNi_bMn_c)_{1-\alpha}O_2$ ($1.2<(1+\alpha)/(1-\alpha)<1.6$, $a+b+c=1$, $a>0$, $b>0$, $c>0$), and is mainly a composite oxide composed of Li, Co, Ni and Mn. It preferably contains Na in an amount of 1000 ppm or more in order to enhance the discharge capacity. The content of Na is more preferably 2000 to 10000 ppm.

In order that the lithium transition metal composite oxide contains Na, a method can be employed in which a sodium compound such as sodium carbonate is used as a neutralizing agent in a step of preparing a carbonate precursor described later and Na is left in a cleaning step, or after these steps, a sodium compound such as sodium carbonate is added in the calcination step.

Further, it is not excluded that the lithium transition metal composite oxide contains a small amount of other metals such as alkali metals other than Na, alkaline earth metals such as Mg, Ca and the like, or transition metals typified by 3d transition metal such as Fe, Zn and the like to an extent not impairing the effect of the present invention.

The lithium transition metal composite oxide according to the present invention has an $\alpha$-$NaFeO_2$ structure. The lithium transition metal composite oxide after being synthesized (before performing charge-discharge) belongs to a space group $P3_112$ or R3-m. In the lithium transition metal composite oxide belonging to the space group $P3_112$ of these space groups, a superlattice peak (a peak found in a monoclinic crystal of Li[Li$_{1/3}$Mn$_{2/3}$]O$_2$ type) is observed near 2θ=21° in an X-ray diffraction pattern using a CuKα tube. However, when once charge is carried out and Li in the crystal desorbs, the superlattice peak disappears due to changes in symmetry of the crystal, and the lithium transition metal composite oxide comes to belong to the space group R3-m. Here, P3$_1$12 is a crystal structure model in which atomic positions of 3a site, 3b site and 6c site in the R3-m are refined, and when regularity is recognized in atomic arrangement in the R3-m, the P3$_1$12 model is employed. Incidentally, "R3-m" should otherwise be denoted by affixing a bar "-" above "3" of "R3m".

In the lithium transition metal composite oxide according to the present invention, a half width of the diffraction peak belonging to the (003) plane in X-ray diffraction measurement is set to within a range of 0.202° to 0.265° when the space group R3-m is used for a crystal structure model based on the X-ray diffraction pattern. By doing so, it becomes possible to improve the initial efficiency and the high rate discharge performance of the positive active material. Incidentally, the diffraction peak present at 2θ=18°±1° in an X-ray diffraction pattern is indexed to a (003) plane in the Miller index hkl in the space groups P3$_1$12 and R3-m.

Further, the lithium transition metal composite oxide according to the present invention exhibits a single phase belonging to a space group R3-m at 1000° C. This means that the lithium transition metal composite oxide according to the present invention does not change in a crystal structure even when heat-treating it at 1000° C. As is understood from Examples described later, this does not mean to obtain the lithium transition metal composite oxide according to the present invention by undergoing a step of heat-treating at 1000° C. It is understood from Comparative Examples 6 and 7 that the lithium transition metal composite oxide according to the present invention is not obtained when a calcination temperature is set to 950° C. or higher in production conditions described in Examples. A feature of the present invention can be confirmed by the fact that the lithium transition metal composite oxide is observed as a single phase (α-NaFeO$_2$ structure) belonging to a space group R3-m in the X-ray diffraction pattern when the lithium transition metal composite oxide is heat-treated at 1000° C. In regard to details on the confirmation method, as described in detail in Examples described later, 1 g of the positive active material is placed in an alumina boat. The boat is placed in an electric furnace, the temperature is elevated from ordinary temperature to 1000° C. over 3 hours and 20 minutes under normal pressure in an air atmosphere, and the positive active material is held at 1000° C. for 10 minutes. Thereafter, the temperature of the positive active material is lowered to ordinary temperature, and powder X-ray diffraction measurement is performed using an X-ray diffractometer. The radiation source is CuKα, and the acceleration voltage and current are 30 kV and 15 mA, respectively. A sampling width is 0.01 degrees, a scanning time is 14 minutes (scanning speed: 5.0), a divergence slit width is 0.625 degrees, a light receiving slit width is open, and a scattering slit is 8.0 mm. In regard to the obtained X-ray diffraction data, an X-ray diffraction pattern in which the most intense peak is a full scale is pictured, and a positive active material in which a diffraction peak resulting from LiMn$_2$O$_4$ is not observed, is thought to "exhibit a single phase belonging to a space group R3-m at 1000° C.".

Thereby, a lithium secondary battery having excellent high rate discharge performance can be attained.

Moreover, in the lithium transition metal composite oxide, an oxygen positional parameter which is determined by crystal structure analysis using a Rietveld method based on an X-ray diffraction pattern is preferably 0.262 or less at the end of discharge and 0.267 or more at the end of charge. Thereby, a lithium secondary battery having excellent high rate discharge performance can be attained. Incidentally, the oxygen positional parameter refers to a value of z at the time when with respect to a crystal structure of an α-NaFeO$_2$ type of a lithium transition metal composite oxide belonging to a space group R3-m, a space coordinate of Me (transition metal) is defined as (0, 0, 0), a space coordinate of Li (lithium) is defined as (0, 0, ½), and a space coordinate of O (oxygen) is defined as (0, 0, z).

That is, the oxygen positional parameter is a relative index indicating how far an O (oxygen) position is from a Me (transition metal) position (refer to Patent Documents 1 and 2).

The lithium transition metal composite oxide according to the present invention and the carbonate precursor thereof preferably have a 50% particle size (D50) of 5 to 18 μm in a particle size distribution measurement. In the case of preparing a lithium transition metal composite oxide from a hydroxide precursor, it is difficult to obtain excellent performance unless the lithium transition metal composite oxide is controlled so as to have a smaller particle size. However, in the case of preparing a lithium transition metal composite oxide from a carbonate precursor, a positive active material having a large discharge capacity is obtained even when the 50% particle size (D50) in a particle size distribution measurement is about 5 to 18 μm.

A BET specific surface area of the positive active material according to the present invention is preferably 1 m$^2$/g or more, and more preferably 2 to 7 m$^2$/g in order to attain a lithium secondary battery having high initial efficiency and excellent high rate discharge performance.

A tapped density is preferably 1.25 g/cc or more, and more preferably 1.7 g/cc or more in order to attain a lithium secondary battery having excellent high rate discharge performance.

The lithium transition metal composite oxide according to the present invention has a pore volume of 0.055 cc/g or more in a pore region where a pore size, at which a differential pore volume determined by a BJH method from an adsorption isotherm using a nitrogen gas adsorption method exhibits a maximum value, is within a range up to 60 nm (pore region up to 60 nm). Thereby, a lithium secondary battery having high initial efficiency and excellent high rate discharge performance can be attained. Further, when the lithium transition metal composite oxide has the pore volume of 0.08 cc/g or less, a lithium secondary battery having particularly excellent high rate discharge performance can be obtained, and therefore the pore volume is preferably 0.055 to 0.08 cc/g.

Next, a method for producing an active material for a lithium secondary battery of the present invention will be described.

The active material for a lithium secondary battery of the present invention can be basically obtained by preparing a raw material containing metal elements (Li, Mn, Co, Ni) for constituting an active material according to the composition of the desired active material (oxide), and calcining the raw material. However, with respect to the amount of the Li raw material, it is preferred to charge the Li raw material in an excessive amount by about 1 to 5% factoring in loss of a part thereof during calcination.

In preparing an oxide having a desired composition, so called a "solid phase method" in which salts of Li, Co, Ni and Mn are mixed and sintered, and so called a "coprecipitation method" in which a coprecipitated precursor with Co, Ni and Mn existing in one particle is prepared in advance, and a Li salt is mixed thereto and the mixture is sintered, are known. In the synthesis process of the "solid phase method", particularly Mn is hard to uniformly solid-solve in Co and Ni, and therefore it is difficult to obtain a sample in which the elements are uniformly distributed in one particle. Hitherto, in documents and so on, many attempts have been made to solid-solve Mn in a part of Ni or Co ($LiNi_{1-x}Mn_xO_2$, etc.) by the solid phase method, but by selecting the "coprecipitation method", a uniform phase is more easily obtained at an atomic level. Thus, in Examples described later, the "coprecipitation method" was employed.

In preparing the coprecipitated precursor, since Mn among Co, Ni and Mn is easily oxidized and it is not easy to prepare the coprecipitated precursor in which Co, Ni and Mn are uniformly distributed in a divalent state, uniform mixing of Co, Ni and Mn at an atomic level tends to become insufficient. Particularly, in a compositional range of the present invention, a ratio of Mn is higher than that of Co or Ni, and therefore it is particularly important to remove dissolved oxygen in an aqueous solution. A method of removing dissolved oxygen includes a method of bubbling a gas not including oxygen. The gas not including oxygen is not particularly limited, and a nitrogen gas, an argon gas, or carbon dioxide ($CO_2$) can be used. Particularly when, as with Example described later, a coprecipitated carbonate precursor is prepared, it is preferred to employ carbon dioxide as a gas not including oxygen since carbon dioxide provides an environment facilitating production of a carbonate.

A pH in the step of coprecipitating compounds containing Co, Ni and Mn, respectively, in a solution to produce a precursor is not limited; however, the pH can be 7.5 to 11 when a coprecipitated carbonate precursor is prepared as the coprecipitated precursor. It is preferred to control a pH in order to increase the tapped density. When the pH is adjusted to 9.4 or less, the tapped density can be 1.25 g/cc or more to improve the high rate discharge performance. Moreover, when the pH is adjusted to 8.0 or less, since a particle growing rate can be accelerated, a stirring duration time after completion of dropwise addition of an aqueous solution of a raw material can be shortened.

The coprecipitated precursor is preferably a compound of Mn, Ni and Co mixed uniformly. In the present invention, in order to obtain an active material for a lithium secondary battery having a large discharge capacity, it is preferred that the coprecipitated precursor is a carbonate. Further, by using a crystallization reaction using a complexing agent, a precursor having a larger bulk density can also be prepared. In doing so, when the coprecipitated precursor is mixed with a Li source and calcined, an active material with a higher density can be attained, and therefore energy density per electrode area can be improved.

Examples of the raw material of the coprecipitated precursor may include manganese oxide, manganese carbonate, manganese sulfate, manganese nitrate and manganese acetate for the Mn compound; nickel hydroxide, nickel carbonate, nickel sulfate, nickel nitrate and nickel acetate for the Ni compound; and cobalt sulfate, cobalt nitrate and cobalt acetate for the Co compound.

In the present invention, a reaction crystallization method in which the aqueous solution of a raw material of the coprecipitated precursor is supplied by dropwise addition to a reaction tank kept alkaline to obtain a coprecipitated carbonate precursor, is employed. Here, lithium compound, sodium compounds, potassium compounds or the like can be used as a neutralizing agent, and sodium carbonate, or a mixture of sodium carbonate and lithium carbonate or mixture of sodium carbonate and potassium carbonate is preferably used. In order to leave Na of 1000 ppm or more in the lithium transition metal composite oxide, Na/Li, a molar ratio of sodium carbonate to lithium carbonate, or Na/K, a molar ratio of sodium carbonate to potassium carbonate, is preferably 1/1 [M] or more. When the Na/Li or the Na/K is 1/1 [M] or more, a possibility that Na is excessively removed in the subsequent cleaning step and the Na content is less than 1000 ppm can be reduced.

A rate of dropwise addition of the aqueous solution of a raw material has a large effect on the uniformity of an element distribution in a particle of the coprecipitated precursor to be produced. Particularly, Mn hardly forms a uniform element distribution with Co and Ni, and therefore the rate of dropwise addition requires attention. A preferred rate of dropwise addition is affected by a size of the reaction tank, stirring conditions, a pH, and a reaction temperature, and the rate of dropwise addition is preferably 30 ml/min or less. For increasing the discharge capacity, the rate of dropwise addition is more preferably 10 ml/min or less, and most preferably 5 ml/min or less.

Further, when a complexing agent is present in the reaction tank and a certain convection condition is applied, rotation of particles and revolution in a stirring tank are accelerated by further continuing stirring after the completion of dropwise addition of the aqueous solution of a raw material, and in this process, particles grow stepwise in the form of a homocentric sphere while impinging on one another. That is, the coprecipitated precursor is formed by undergoing two-staged reactions of a metal complex formation reaction in adding dropwise the aqueous solution of a raw material to the reaction tank and a precipitate formation reaction occurring while the metal complex remains in the reaction tank. Accordingly, by appropriately selecting a time during which stirring is further continued after the completion of dropwise addition of the aqueous solution of a raw material, a coprecipitated precursor having a desired particle size can be obtained.

The stirring duration time after the completion of dropwise addition of an aqueous solution of a raw material is preferably 0.5 hours or more, and more preferably 1 hour or more in order to grow particles as uniform spherical particles although a preferred stirring duration time is affected by a size of the reaction tank, stirring conditions, a pH, and a reaction temperature. Further, the stirring duration time is preferably 30 hours or less, more preferably 25 hours or less, and most preferably 20 hours or less in order to reduce a possibility that power performance in a low SOC region of a battery is insufficient due to a too large particle size.

Further, a preferred stirring duration time for bringing the D50, a particle size at which a cumulative volume reaches 50% in a particle size distribution of the secondary particles of the carbonate precursor and the lithium transition metal composite oxide, into 5 to 18 µm varies with a desired pH. For example, when the pH is controlled so as to be 7.5 to 8.2, the stirring duration time is preferably 1 to 15 hours, and when the pH is controlled so as to be 8.3 to 9.4, the stirring duration time is preferably 3 to 20 hours.

When particles of the carbonate precursor were prepared using a sodium compound such as sodium carbonate as a neutralizing agent, sodium ions adhering to the particles are cleaned for removal in a subsequent cleaning step, and in the present invention, it is preferred to clean for removal in the condition in which 1000 ppm or more of Na remains. For example, the condition that the number of cleanings with 200 ml of ion-exchange water in taking out the prepared carbonate precursor by suction filtration is 5 times can be employed.

The carbonate precursor is preferably dried at a temperature of at least 80° C. and lower than 100° C. under ordinary pressure in an air atmosphere. Although more water content can be removed in a short time if the carbonate precursor is dried at 100° C. or higher, an active material exhibiting higher electrode properties can be formed by drying at 80° C. over a long time. The reason for this is not necessarily clear; however, the carbonate precursor has a structure which easily adsorbs a water content since it is a porous body having a specific surface area of 50 to 100 m²/g. Accordingly, the present inventor supposes that when the carbonate precursor becomes a state in which a certain level of adsorbed water remains in pores in a precursor state by drying the precursor at low temperature, melted Li can impregnate the pores changing place with adsorbed water to be removed from the pores in a calcination step of calcining a mixture of the precursor and a Li salt, and thereby, an active material having a more uniform composition is obtained compared with the case in which the precursor is dried at 100° C. Incidentally, the carbonate precursor which is dried at 100° C. shows blackish brown, but the carbonate precursor which is dried at 80° C. shows flesh color, and therefore, both precursors can be discriminated from each other by a color of the precursor.

Accordingly, in order to quantitatively evaluate a difference between the precursors found above, a hue of each precursor was measured and compared with "JPMA Standard Paint Colors" 2011 F-Edition issued by Japan Paint Manufacturers Association according to JIS Z 8721. Color Reader CR-10 manufactured by KONICA MINOLTA, INC. was used for measurement of the hue. By this measurement method, a value of dL* representing lightness is large to white and small to black. A value of da* representing a hue is large to a subject which is intense in red and small to a subject which is intense in green (weak in red). A value of db* representing a hue is large to a subject which is intense in yellow and large to a subject which is intense in blue (weak in yellow).

It was found that a hue of a product dried at 100° C. is within a range to a standard color F05-40D in a red color direction compared with a standard color F05-20B, and within a range to a standard color FN-25 in a white color direction compared with a standard color FN-10. Particularly, a color difference with a hue which the standard color F05-20B shows is found to be the smallest.

Meanwhile, it was found that a hue of a product dried at 80° C. is within a range to a standard color F19-70F in a white color direction compared with a standard color F19-50F, and within a range to a standard color F09-60H in a black color direction compared with a standard color F09-80D. Particularly, a color difference with a hue which the standard color F19-50F shows is found to be the smallest.

From findings described above, it is said that the hue of the carbonate precursor preferably lies in a plus (+) direction compared with the standard color F05-20B in all of dL, da and db, and more preferably +5 or more in dL, +2 or more in da, and +5 or more in db.

The active material for a lithium secondary battery of the present invention can be suitably prepared by mixing the carbonate precursor and a Li compound, followed by heat-treating the mixture. By using, as the Li compound, lithium hydroxide, lithium carbonate, lithium nitrate, lithium acetate or the like, the active material can be suitably produced. For the amount of the Li compound, however, it is preferred to charge the Li compound in an excessive amount by about 1 to 5% factoring in loss of a part thereof during calcination.

In the present invention, in order to bring the Na content in the lithium transition metal composite oxide into 1000 ppm or more, even if the Na content contained in a carbonate precursor is 1000 ppm or less, the Na content contained in the active material can be 1000 ppm or more by mixing a Na compound with the carbonate precursor together with a Li compound in the calcination step. As the Na compound, sodium carbonate is preferred.

The calcination temperature has an effect on a reversible capacity of the active material.

When the calcination temperature is too high, the resulting active material corrupts in association with an oxygen releasing reaction and in addition to the hexagonal main phase, a phase defined as monoclinic $Li[Li_{1/3}Mn_{2/3}]O_2$ tends to be observed as a separate phase but not as a solid solution phase. It is not preferred to contain a too high proportion of such a separate phase since this leads to a reduction of the reversible capacity of the active material. With respect to such a material, impurity peaks are observed near 35° and 45° in the X-ray diffraction pattern. Accordingly, it is preferred that the calcination temperature is adjusted lower than the temperature which affects the oxygen releasing reaction of the active material. In the composition range of the present invention, the oxygen releasing temperature of the active material is around 1000° C. or higher; however, the oxygen releasing temperature slightly differs depending on the composition of the active material, and therefore it is preferred to previously check the oxygen releasing temperature of the active material. Particularly, it is confirmed that the oxygen releasing temperature of a precursor is shifted to the lower temperature as the Co amount contained in a sample is larger, and therefore the calcination temperature requires attention. As a method for checking the oxygen releasing temperature of the active material, a mixture of a coprecipitated precursor and a lithium compound may be subjected to thermogravimetry (DTA-TG measurement) in order to simulate the calcination reaction process; however in this method, platinum employed for a sample chamber of a measurement instrument may be possibly corroded with an evaporated Li component to damage the instrument. Therefore, a composition, of which crystallization has been promoted to a certain extent by employing a calcination temperature of about 500° C., is preferable to be subjected to thermogravimetry.

On the other hand, when the calcination temperature is too low, there is such a tendency that crystallization does not adequately proceed and an electrode performance is lowered. In the present invention, the calcination temperature is preferably set to 800° C. or higher. By adequate crystallization, resistance at a grain boundary can be reduced and smooth lithium ion transport can be promoted.

Further, the present inventors confirmed by analyzing a half width of a diffraction peak of the active material of the present invention in detail that the strain remains in a lattice in the sample synthesized at a temperature lower than 750° C., and most of the strain can be eliminated by synthesizing the active material at a temperature of 750° C. or higher. Further, a size of a crystallite increased in proportion to a rise of a synthesis temperature. Therefore, in the composition of the active material of the present invention, a good discharge capacity was obtained by aspiring to particles in which there is little lattice distortion in a system and a size of a crystallite adequately grows. Specifically, it was found to be preferred that a synthesis temperature (calcination temperature) and composition as a Li/Me ratio at which an amount of strain to a lattice constant is 2% or less and the size of a crystallite has grown to 50 nm or more, are employed.

When these active materials are formed into an electrode and charge-discharge is performed, it is preferred as the effect to be obtained that the size of a crystallite is also maintained at 30 nm or more during a charge-discharge process although the size varies due to expansion/contraction.

As described above, the calcination temperature has relations with an oxygen releasing temperature of the active material; however, even if a temperature does not reach a calcination temperature at which oxygen is released from the active material, a crystallization phenomenon due to growth of a size of the primary particle is found if exceeding 900° C. This can be verified by observing the calcined active material with a scanning electron microscope (SEM). An active material synthesized by undergoing a synthesis temperature exceeding 900° C. becomes a state in which the primary particles grow to a size of 0.5 µm or more, adversely impacting Li+ movement in the active material during a charge-discharge reaction, and therefore the high rate discharge performance is deteriorated. A size of the primary particle is preferably less than 0.5 µm, and more preferably 0.3 µm or less. Further, a pore volume of the active material is less than 0.055 cc/g in a pore region up to 60 nm in the case of the synthesis temperature exceeding 900° C., and therefore the initial efficiency and the high rate discharge performance are deteriorated.

Accordingly, when the lithium transition metal composite oxide according to the present invention in which 1.2<molar ratio Li/Me<1.6, is used as a positive active material, it is preferred that the calcination temperature is set to 800 to 900° C. in order to improve the initial efficiency and the high rate discharge performance.

In the present invention, the lithium transition metal composite oxide thus prepared is subjected to acid treatment. By performing the acid treatment, both of the initial efficiency and the high rate discharge performance are improved compared with the case where the acid treatment is not performed. As an acid, sulfuric acid is preferred. When the lithium transition metal composite oxide is acid-treated with an acid such as nitric acid, the crystal structure before acid treatment may collapse, leading to deterioration of the high rate discharge performance. A time of acid treatment by sulfuric acid is preferably 30 seconds to 60 seconds. If the lithium transition metal composite oxide is acid-treated for 180 seconds or more, the initial efficiency is improved, but a crystal structure before the acid treatment possibly cannot be maintained and the high rate discharge performance is deteriorated. Incidentally, sulfur (S) resulting from sulfuric acid remains in the lithium transition metal composite oxide having acid-treated by the sulfuric acid.

The negative electrode material is not limited, and any material may be selected as long as it can release or absorb lithium ions. Examples thereof include titanium-based materials such as lithium titanate having a spinel-type crystal structure typified by $Li[Li_{1/3}Ti_{5/3}]O_4$, alloy-based materials such as Si-, Sb- and Sn-based alloy materials, lithium metal, lithium alloys (lithium metal-containing alloys such as lithium-silicon, lithium-aluminum, lithium-lead, lithium-tin, lithium-aluminum-tin, lithium-gallium and wood alloys), lithium composite oxides (lithium-titanium) and silicon oxide as well as alloys capable of absorption/release of lithium, and carbon materials (e.g., graphite, hard carbon, low temperature-calcined carbon and amorphous carbon).

A powder of the positive active material and a powder of the negative electrode material preferably have an average particle size of 100 µm or less. Particularly, the powder of the positive active material preferably has an average particle size of 10 µm or less for the purpose of improving a high-power performance of the nonaqueous electrolyte battery. A pulverizer and a classifier are used for obtaining a powder in a predetermined shape. For example, a mortar, a ball mill, a sand mill, a vibration ball mill, a planetary ball mill, a jet mill, a counter jet mill, a swirling air flow jet mill, a sieve or the like is used. At the time of pulverizing, wet crushing can also be used in which water, or an organic solvent such as hexane coexists. The classification method is not particularly limited, and a sieve, an air classifier or the like is used as required in both dry and wet processes.

The positive active material and the negative electrode material which are main components of the positive electrode and the negative electrode have been described in detail above. The aforementioned positive electrode and negative electrode may contain, in addition to the aforementioned main components, a conducting agent, a binding agent, a thickener, a filler and the like as other components.

The conducting agent is not limited as long as it is an electron-conductive material that has no adverse effect on battery performance, and normally the conducting agent may include one of or a mixture of conductive materials such as natural graphite (scaly graphite, flake graphite, earthy graphite, etc.), artificial graphite, carbon black, acetylene black, Ketjen black, carbon whisker, carbon fibers, metal (copper, nickel, aluminum, silver, gold, etc.) powders, metal fibers and conductive ceramic materials.

Among them, acetylene black is preferable as a conducting agent from the viewpoint of electron conductivity and coating properties. The additive amount of the conducting agent is preferably 0.1% by weight to 50% by weight, and particularly preferably 0.5% by weight to 30% by weight with respect to the total weight of the positive electrode or negative electrode. Particularly, use of acetylene black pulverized into ultrafine particles of 0.1 to 0.5 µm is preferable because the required amount of carbon can be reduced. These mixing methods involve physical mixing, the ideal of which is homogeneous mixing.

Thus, mixing can be carried out in a dry process or a wet process using a powder mixer such as a V-type mixer, an S-type mixer, a Raikai mixer, a ball mill or a planetary ball mill.

As the binding agent, thermoplastic resins such as polytetrafluoroethylene (PTFE), polyvinylidene fluoride (PVDF), polyethylene and polypropylene, and polymers having rubber elasticity, such as ethylene-propylene-diene terpolymer (EPDM), sulfonated EPDM, styrene-butadiene rubber (SBR) and fluororubber can normally be used alone or as a mixture of two or more thereof. The additive amount of the binding agent is preferably 1 to 50% by weight, and particularly preferably 2 to 30% by weight with respect to the total weight of the positive electrode or negative electrode.

The filler may be any material as long as it has no adverse effect on battery performance. An olefin-based polymer such as polypropylene or polyethylene, amorphous silica, alumina, zeolite, glass, carbon or the like is normally used. The additive amount of the filler is preferably 30% by weight or less with respect to the total amount of the positive electrode or the negative electrode.

The positive electrode and the negative electrode are suitably prepared by kneading the aforementioned main components (positive active material in the positive electrode and negative electrode material in the negative electrode) and other materials to form a composite, and mixing the composite with an organic solvent such as N-methylpyrrolidone or toluene, or water, followed by applying or press-bonding the resulting mixed liquid onto a current collector of an aluminum foil or the like, and carrying out a heating treatment at a temperature of about 50° C. to 250° C. for about 2 hours. For the aforementioned coating method, for example, it is preferable to perform coating in any thickness and any shape using means such as roller coating by an applicator roll or the like, screen coating, a doctor blade system, spin coating or a bar coater, but the coating method is not limited thereto.

The nonaqueous electrolyte used in the lithium secondary battery according to the present invention is not limited, and those that are generally proposed to be used in lithium batteries and the like can be used. Examples of the nonaqueous solvent used in the nonaqueous electrolyte may include, but are not limited to, cyclic carbonates such as propylene carbonate, ethylene carbonate, butylene carbonate, chloroethylene carbonate and vinylene carbonate; cyclic esters such as γ-butyrolactone and γ-valerolactone; chain carbonates such as dimethyl carbonate, diethyl carbonate and ethylmethyl carbonate; chain esters such as methyl formate, methyl acetate and methyl butyrate; tetrahydrofuran or derivatives thereof; ethers such as 1,3-dioxane, 1,4-dioxane, 1,2-dimethoxyethane, 1,4-dibutoxyethane and methyl diglyme; nitriles such as acetonitrile and benzonitrile; dioxolane or derivatives thereof; and ethylene sulfide, sulfolane, sultone or derivatives thereof alone or mixtures of two or more thereof.

Examples of the electrolyte salt used in the nonaqueous electrolyte include inorganic ion salts including one of lithium (Li), sodium (Na) and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$ and KSCN; and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phtalate, lithium stearylsulfonate, lithium octylsulfonate and lithium dodecylbenzenesulfonate, and these ionic compounds can be used alone or in combination of two or more thereof.

Further, by mixing $LiPF_6$ or $LiBF_4$ with a lithium salt having a perfluoroalkyl group, such as $LiN(C_2F_5SO_2)_2$, the viscosity of the electrolyte can be further reduced, and therefore the low-temperature performance can be further enhanced, and self discharge can be suppressed, thus being more preferable.

Further, an ambient temperature molten salt or an ion liquid may be used as a nonaqueous electrolyte.

The concentration of the electrolyte salt in the nonaqueous electrolyte is preferably 0.1 mol/l to 5 mol/l, and more preferably 0.5 mol/l to 2.5 mol/l for reliably obtaining a nonaqueous electrolyte battery having high battery performance.

As a separator, it is preferred that a porous membrane, a nonwoven fabric or the like, which shows excellent high rate discharge performance, be used alone or in combination. Examples of the material constituting the separator for a nonaqueous electrolyte battery include polyolefin-based resins typified by polyethylene, polypropylene and the like, polyester-based resins typified by polyethylene terephthalate, polybutylene terephthalate and the like, polyvinylidene fluoride, vinylidene fluoride-hexafluoropropylene copolymers, vinylidene fluoride-perfluoro vinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers and vinylidene fluoride-ethylene-tetrafluoroethylene copolymers.

The porosity of the separator is preferably 98% by volume or less from the viewpoint of the strength. The porosity is preferably 20% by volume or more from the viewpoint of charge-discharge performance.

Further, a polymer gel formed of a polymer such as acrylonitrile, ethylene oxide, propylene oxide, methyl methacrylate, vinyl acetate, vinyl pyrrolidone or polyvinylidene fluoride, and an electrolyte may be used for the separator. Use of the nonaqueous electrolyte in a gel form as described above is preferred from the viewpoint of being effective at preventing liquid leakage.

Moreover, use of the aforementioned porous membrane, nonwoven fabric or the like and the polymer gel in combination for the separator is preferable since liquid retainability of the electrolyte is improved. That is, a film in which the surface and the microporous wall face of a polyethylene microporous membrane are coated with a solvophilic polymer having a thickness of several micrometers or less is formed, and an electrolyte is held within the micropores of the film, so that the solvophilic polymer is formed into a gel.

Examples of the solvophilic polymer include, in addition to polyvinylidene fluoride, polymers in which an acrylate monomer having an ethylene oxide group, an ester group or the like, an epoxy monomer, a monomer having an isocyanate group or the like is crosslinked. The monomer can be subjected to a crosslinking reaction by carrying out heating or using ultraviolet rays (UV) while using a radical initiator at the same time, or using active light rays such as electron beams (EB) or the like.

Other components of a battery includes a terminal, an insulating plate, a battery case and the like, and for these parts, heretofore used parts may be used as-is.

Figure 1:
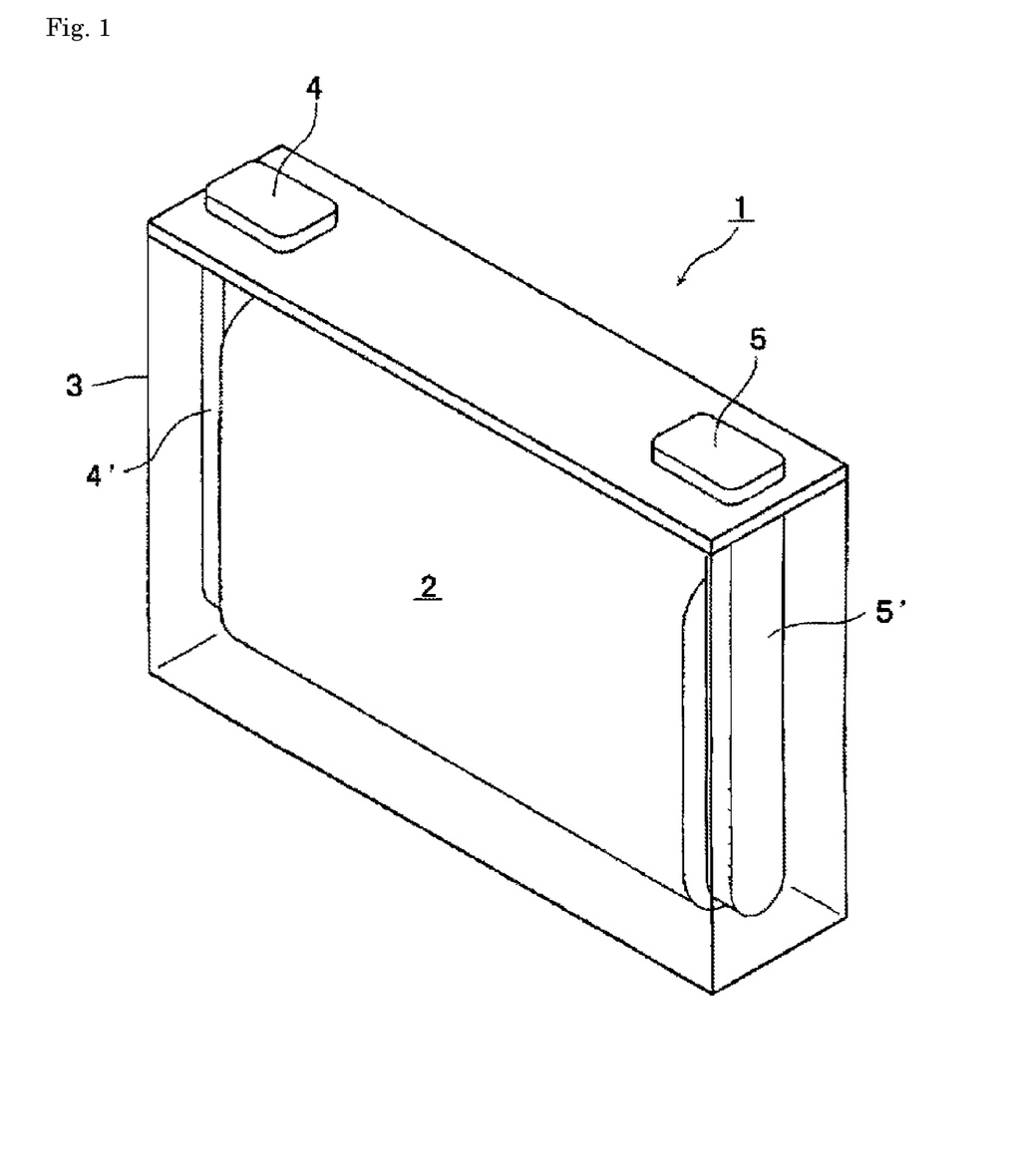
FIG. 1 is a perspective view of an appearance showing an embodiment of a lithium secondary battery according to the present invention.

FIG. 1 shows a perspective view of an appearance of a rectangular lithium secondary battery 1 which is an embodiment of the lithium secondary battery according to the present invention. Incidentally, FIG. 1 is a perspective view of the inside of a container. In the lithium secondary battery 1 shown in FIG. 1, an electrode group 2 is housed in a battery container 3. The electrode group 2 is configured by winding a positive electrode including a positive active material and a negative electrode including a negative active material with a separator interposed therebetween. The positive electrode is electrically connected to a positive electrode terminal 4 via a positive electrode lead 4', and the negative electrode is electrically connected to a negative electrode terminal 5 via a negative electrode lead 5'.

Figure 2:
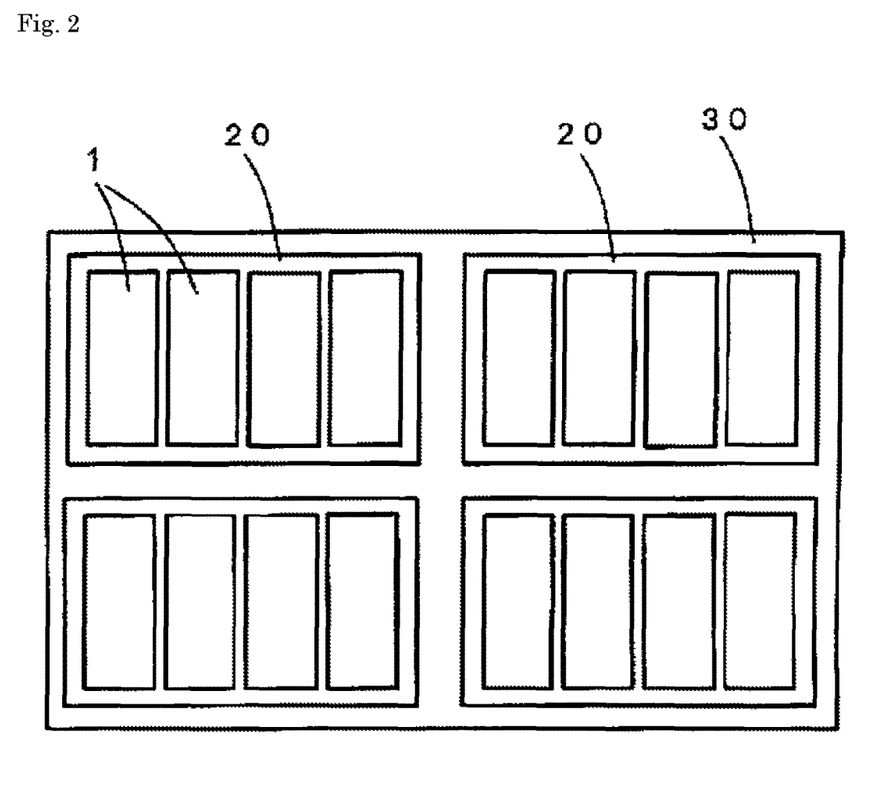
FIG. 2 is a schematic view showing an energy storage apparatus in which a plurality of the lithium secondary batteries according to the present invention are assembled.

The configuration of the lithium secondary battery according to the present invention is not particularly limited, and examples thereof include a cylindrical battery, a prismatic battery (rectangular battery) and a flat battery. The present invention can also be realized as energy storage apparatus in which a plurality of the lithium secondary batteries are assembled. An embodiment of the energy storage apparatus is shown in FIG. 2. In FIG. 2, the energy storage apparatus 30 includes a plurality of energy storage units 20. Each of the energy storage units 20 includes a plurality of lithium secondary batteries 1. The energy storage apparatus 30 can be mounted as a power source for automobiles such as electric automobiles (EV), hybrid automobiles (HEV) and plug-in hybrid automobiles (PHEV).

Both the conventional positive active material and the active material of the present invention are capable of charge-discharge at a positive electrode potential of around 4.5 V (vs. Li/Li$^+$). However, depending on the type of a nonaqueous electrolyte used, battery performance may be deteriorated by oxidative decomposition of the nonaqueous electrolyte if the positive electrode potential during charge is too high. Therefore, a lithium secondary battery, with which a sufficient discharge capacity is obtained even when such a charge method that the maximum achievable potential of the positive electrode during charge is 4.3 V (vs. Li/Li$^+$) or less is employed at the time of operation, may be required. When the active material of the present invention is used, an discharge electrical quantity of about 200 mAh/g or more exceeding the capacity of the conventional positive active material can be obtained even when such a charge method that the maximum achievable potential of the positive electrode during charge is lower than 4.5 V (vs. Li/Li$^+$), for example 4.4 V (vs. Li/Li$^+$) or less or 4.3 V (vs. Li/Li$^+$) or less, is employed at the time of operation.

In order to make the positive active material according to the present invention have a high discharge capacity, it is preferred that a rate, at which transition metal elements composing the lithium transition metal composite oxide exist in a portion other than a transition metal site in a crystal structure of a layered rock salt type, is small. This can be achieved by adequately uniform distribution of transition metal elements such as Co, Ni and Mn of a precursor core-particle in the precursor to be subjected to a calcination step, and by selecting appropriate conditions of a calcination step for promoting crystallization of an active material sample. When transition metals are not uniformly distributed in the precursor core-particle to be subjected to a calcination step, a sufficient discharge capacity cannot be obtained. The reason for this is not necessarily clear, but the present inventors guess that this results from the fact that when transition metals are not uniformly distributed in the precursor core-particle to be subjected to a calcination step, a part of transition metal elements of the resulting lithium transition metal composite oxide exists in a portion other than a transition metal site, that is, a lithium site, in a crystal structure of a layered rock salt type, and cation mixing occurs. Similar consideration can also be applied in a crystallization process in the calcination step, and when crystallization of the active material sample is inadequate, cation mixing in a crystal structure of a layered rock salt type tends to occur. The precursor in which distributions of the transition metal elements are highly uniform tends to have a larger intensity ratio between the diffraction peaks of a (003) plane and a (104) plane in the case where the results of X-ray diffraction measurement belong to a space group R3-m. In the present invention, the ratio between the diffraction peak intensity $I_{(003)}$ of a (003) plane and the diffraction peak intensity $I_{(104)}$ of a (104) plane based on the X-ray diffraction measurement is preferably 1.0 or more at the end of discharge, and 1.75 or more at the end of charge. When a synthesis condition or a synthesis procedure of the precursor is improper, the peak intensity ratio becomes smaller and often becomes a value less than 1.

By employing synthesis conditions and synthesis procedures described in the present specification, the aforementioned high performance positive active material can be obtained. Particularly, even when an upper limit potential of charge is set below 4.5 V (vs. Li/Li$^+$), for example, below 4.4 V (vs. Li/Li$^+$) or 4.3 V (vs. Li/Li$^+$), a positive active material for a lithium secondary battery which can attain a high discharge capacity can be formed.

EXAMPLES

Example 1

Precursor Preparation Step

Cobalt sulfate heptahydrate (14.08 g), nickel sulfate hexahydrate (21.00 g) and manganese sulfate pentahydrate (65.27 g) were weighed, and totally dissolved in 200 ml of ion-exchange water to prepare a 2.0 M sulfate aqueous solution of which the molar ratio of Co:Ni:Mn was 12.50:19.94:67.56. Meanwhile, 750 ml of ion exchange-water was poured into a 2 L reaction tank, and a $CO_2$ gas was bubbled for 30 min to thereby dissolve $CO_2$ in ion-exchange water.

The temperature of the reaction tank was set at 50° C. (±2° C.), and the sulfate aqueous solution was added dropwise at a rate of 3 ml/min while stirring the contents in the reaction tank at a rotation speed of 700 rpm using a paddle impeller equipped with a stirring motor. Here, between the start of dropwise addition and the completion of dropwise addition, a pH of a solution in the reaction tank was controlled so as to be always kept at 7.9 (±0.05) by appropriately adding dropwise an aqueous solution including 1.0 M sodium carbonate, 1.0 M lithium carbonate and 0.4 M ammonia. After the completion of dropwise addition, stirring of the reaction liquid in the reaction tank was further continued for 3 hours. After completion of stirring, the reaction liquid was left standing for 12 hours or more.

Next, using a suction filtration apparatus, particles of a coprecipitated carbonate produced in the reaction tank were separated, and sodium ions adhering to the particles were cleaned for removal with ion-exchange water under the condition that 200 ml of ion-exchange water is used for every cleaning and this cleaning is carried out 5 times. The resulting particles were dried at 80° C. for 20 hours under ordinary pressure in an air atmosphere by using an electric furnace. Thereafter, particles were pulverized for several minutes with use of an automatic mortar made of agate in order to level particle diameters. In this way, a coprecipitated carbonate precursor was prepared.

<Calcination Step>

To 2.227 g of the coprecipitated carbonate precursor, lithium carbonate was added in such a way that the molar ratio of Li to (Co, Ni, Mn) was 1.4, and the resulting mixture was adequately mixed with use of an automatic mortar made of agate to prepare a mixed powder. The powder was molded at a pressure of 6 MPa using a pelleting machine to form pellets having a diameter of 25 mm. The amount of the mixed powder subjected to pellet molding was determined by calculating an amount equivalent to a mass of 2 g of a supposed final product. One of the pellets was placed in an alumina boat having a total length of about 100 mm, the boat was placed in a box-type electric furnace (model: AMF 20), a temperature was elevated from ordinary temperature to 850° C. over 10 hours under normal pressure in an air atmosphere, and the pellet was calcined at 850° C. for 4 hours. The box-type electric furnace had an internal dimension of 10 cm (height), 20 cm (width) and 30 cm (depth), and provided with electrically heated wires at intervals of 20 cm in the width direction. After calcining, a switch of the heater was turned off, and the alumina boat was naturally cooled as it was left standing in the furnace. As a result, the temperature of the furnace decreased to about 200° C. after 5 hours, but the subsequent temperature fall rate was slightly mild. After elapse of a whole day and night, the pellet was taken out after confirming that the temperature of the furnace was 100° C. or lower, and milled by an automatic mortar made of agate for several minutes for leveling the particle size. In this way, a lithium transition metal composite oxide $Li_{1.17}Co_{0.10}Ni_{0.17}Mn_{0.56}O_2$ of a starting material which contains 2100 ppm of Na and has D50 of 8 μm was prepared. It was confirmed by X-ray diffraction measurement that the lithium transition metal composite oxide had an α-NaFeO$_2$ structure.

<Acid Treatment Step>

A 0.05 M sulfuric acid aqueous solution (200 ml) was put in a conical flask containing a stirring bar previously placed therein, the lithium transition metal composite oxide of a starting material (5.00 g) was added to this, and the conical flask was set on a magnetic stirrer. Then, acid treatment of the resulting mixture was performed by stirring the mixture at a rotation speed of 400 rpm at room temperature for 30 seconds. The lithium transition metal composite oxide after acid treatment was separated by filtration, washed with about 1 liter of ion-exchange water, and dried overnight at 80° C. in a thermostat bath. In this way, a lithium transition metal composite oxide (acid-treated sample) according to Example 1 was prepared.

Example 2

A lithium transition metal composite oxide according to Example 2 was prepared in the same manner as in Example 1 except for changing an acid treatment time from 30 seconds to 60 seconds in the acid treatment step.

Example 3

A lithium transition metal composite oxide according to Example 3 was prepared in the same manner as in Example 1 except for changing a calcination temperature from 850° C. to 800° C. in the calcination step.

Example 4

A lithium transition metal composite oxide according to Example 4 was prepared in the same manner as in Example 2 except for changing a calcination temperature from 850° C. to 800° C. in the calcination step.

Example 5

A lithium transition metal composite oxide according to Example 5 was prepared in the same manner as in Example 1 except for changing a calcination temperature from 850° C. to 900° C. in the calcination step.

Example 6

A lithium transition metal composite oxide according to Example 6 was prepared in the same manner as in Example 2 except for changing a calcination temperature from 850° C. to 900° C. in the calcination step.

Example 7

A lithium transition metal composite oxide according to Example 7 was prepared in the same manner as in Example 1 except that in the calcination step, lithium carbonate was added to 2.278 g of the coprecipitated carbonate precursor in such a way that the molar ratio of Li to (Co, Ni, Mn) was 1.3 to prepare a mixed powder and a lithium transition metal composite oxide $Li_{1.13}Co_{0.11}Ni_{0.17}Mn_{0.59}O_2$ of a starting material was prepared.

Example 8

A lithium transition metal composite oxide according to Example 8 was prepared in the same manner as in Example 2 except that in the calcination step, lithium carbonate was added to 2.278 g of the coprecipitated carbonate precursor in such a way that the molar ratio of Li to (Co, Ni, Mn) was 1.3 to prepare a mixed powder and a lithium transition metal composite oxide $Li_{1.13}Co_{0.11}Ni_{0.17}Mn_{0.59}O_2$ of a starting material was prepared.

Example 9

A lithium transition metal composite oxide according to Example 9 was prepared in the same manner as in Example 1 except that in the calcination step, lithium carbonate was added to 2.126 g of the coprecipitated carbonate precursor in such a way that the molar ratio of Li to (Co, Ni, Mn) was 1.6 to prepare a mixed powder and a lithium transition metal composite oxide $Li_{1.23}Co_{0.10}Ni_{0.15}Mn_{0.52}O_2$ of a starting material was prepared.

Example 10

A lithium transition metal composite oxide according to Example 10 was prepared in the same manner as in Example 2 except that in the calcination step, lithium carbonate was added to 2.126 g of the coprecipitated carbonate precursor in such a way that the molar ratio of Li to (Co, Ni, Mn) was 1.6 to prepare a mixed powder and a lithium transition metal composite oxide $Li_{1.23}Co_{0.10}Ni_{0.15}Mn_{0.52}O_2$ of a starting material was prepared.

Comparative Example 1

A lithium transition metal composite oxide according to Comparative Example 1 was prepared in the same manner as in Example 1 except that the acid treatment was not performed.

Comparative Example 2

A lithium transition metal composite oxide according to Comparative Example 2 was prepared in the same manner as in Example 1 except for changing an acid treatment time from 30 seconds to 180 seconds in the acid treatment step.

Comparative Example 3

A lithium transition metal composite oxide according to Comparative Example 3 was prepared in the same manner as in Example 1 except for changing an acid treatment time from 30 seconds to 600 seconds in the acid treatment step.

Comparative Example 4

A lithium transition metal composite oxide according to Comparative Example 4 was prepared in the same manner as in Example 1 except for changing a calcination temperature from 850° C. to 750° C. in the calcination step.

Comparative Example 5

A lithium transition metal composite oxide according to Comparative Example 5 was prepared in the same manner as in Example 2 except for changing a calcination temperature from 850° C. to 750° C. in the calcination step.

Comparative Example 6

A lithium transition metal composite oxide according to Comparative Example 6 was prepared in the same manner as in Example 1 except for changing a calcination temperature from 850° C. to 950° C. in the calcination step.

Comparative Example 7

A lithium transition metal composite oxide according to Comparative Example 7 was prepared in the same manner as in Example 2 except for changing a calcination temperature from 850° C. to 950° C. in the calcination step.

Comparative Example 8

A lithium transition metal composite oxide according to Comparative Example 8 was prepared in the same manner as in Example 1 except that in the calcination step, lithium carbonate was added to 2.339 g of the coprecipitated carbonate precursor in such a way that the molar ratio of Li to (Co, Ni, Mn) was 1.2 to prepare a mixed powder and a lithium transition metal composite oxide $Li_{1.09}Co_{0.11}Ni_{0.18}Mn_{0.62}O_2$ of a starting material was prepared.

Comparative Example 9

A lithium transition metal composite oxide according to Comparative Example 9 was prepared in the same manner as in Example 2 except that in the calcination step, lithium carbonate was added to 2.339 g of the coprecipitated carbonate precursor in such a way that the molar ratio of Li to (Co, Ni, Mn) was 1.2 to prepare a mixed powder and a lithium transition metal composite oxide $Li_{1.09}Co_{0.11}Ni_{0.18}Mn_{0.62}O_2$ of a starting material was prepared.

Comparative Example 10

A lithium transition metal composite oxide according to Comparative Example 10 was prepared in the same manner as in Example 1 except that in the calcination step, lithium carbonate was added to 2.104 g of the coprecipitated carbonate precursor in such a way that the molar ratio of Li to (Co, Ni, Mn) was 1.65 to prepare a mixed powder and a lithium transition metal composite oxide $Li_{1.25}Co_{0.09}Ni_{0.15}Mn_{0.51}O_2$ of a starting material was prepared.

Comparative Example 11

A lithium transition metal composite oxide according to Comparative Example 11 was prepared in the same manner as in Example 2 except that in the calcination step, lithium carbonate was added to 2.104 g of the coprecipitated carbonate precursor in such a way that the molar ratio of Li to (Co, Ni, Mn) was 1.65 to prepare a mixed powder and a lithium transition metal composite oxide $Li_{1.25}Co_{0.09}Ni_{0.15}Mn_{0.51}O_2$ of a starting material was prepared.

Comparative Example 12

A lithium transition metal composite oxide according to Comparative Example 12 was prepared in the same manner as in Example 1 except that in the acid treatment step, a 0.10 M nitric acid aqueous solution (100 ml) was put in a conical flask containing a stirring bar previously placed therein and the lithium transition metal composite oxide of a starting material (2.00 g) was added to this to perform acid treatment.

Comparative Example 13

A lithium transition metal composite oxide according to Comparative Example 13 was prepared in the same manner as in Example 2 except that in the acid treatment step, a 0.10 M nitric acid aqueous solution (100 ml) was put in a conical flask containing a stirring bar previously placed therein and the lithium transition metal composite oxide of a starting material (2.00 g) was added to this to perform acid treatment.

Comparative Example 14

Precursor Preparation Step

Cobalt sulfate heptahydrate (14.08 g), nickel sulfate hexahydrate (21.00 g) and manganese sulfate pentahydrate (65.27 g) were weighed, and totally dissolved in 200 ml of ion-exchange water to prepare a 2.0 M sulfate aqueous solution of which the molar ratio of Co:Ni:Mn was 12.50: 19.94: 67.56. Meanwhile, 750 ml of ion exchange-water was poured into a 2 L reaction tank, and an Ar gas was bubbled for 30 min to thereby degas oxygen dissolved in ion-exchange water. The temperature of the reaction tank was set at 50° C. (±2° C.), and the sulfate aqueous solution was added dropwise at a rate of 3 ml/min while stirring the contents in the reaction tank at a rotation speed of 700 rpm using a paddle impeller equipped with a stirring motor. Here, between the start of dropwise addition and the completion of dropwise addition, a pH of a solution in the reaction tank was controlled so as to be always kept at 11.0 (±0.05) by appropriately adding dropwise an aqueous solution including 2.0 M sodium hydroxide and 0.5 M ammonia. After the completion of dropwise addition, stirring of the reaction liquid in the reaction tank was further continued for 3 hours. After completion of stirring, the reaction liquid was left standing for 12 hours or more.

Next, using a Buchner funnel (130 mmφ) and a suction filtration apparatus, particles of a coprecipitated hydroxide produced in the reaction tank were separated, and 100 ml of ion-exchange water was poured in the Buchner funnel and the coprecipitated compound was stirred with a glass rod to clean the coprecipitated compounds. By carrying out this cleaning operation one time, sodium ions adhering to the particles were cleaned and removed. Then, the resulting particles were dried at 100° C. under ordinary pressure in an air atmosphere by using an electric furnace. Thereafter, particles were pulverized for several minutes with use of an automatic mortar made of agate in order to level particle diameters. In this way, a coprecipitated hydroxide precursor was prepared.

<Calcination Step>

To 1.768 g of the coprecipitated hydroxide precursor, lithium hydroxide was added in such a way that the molar ratio (Li/Me (Co, Ni, Mn)) (molar ratio of mixed lithium hydroxide to the coprecipitated hydroxide precursor) was 1.5, and the resulting mixture was adequately mixed with use of an automatic mortar made of agate to prepare a mixed powder. The powder was molded at a pressure of 6 MPa using a pelleting machine to form pellets having a diameter of 25 mm. The amount of the mixed powder subjected to pellet molding was determined by calculating an amount equivalent to a mass of 2 g of a supposed final product. One of the pellets was placed in an alumina boat having a total length of about 100 mm, the boat was placed in a box-type electric furnace (model: AMF 20), a temperature was elevated from ordinary temperature to 1000° C. over 10 hours under normal pressure in an air atmosphere, and the pellet was calcined at 1000° C. for 4 hours. The box-type electric furnace had an internal dimension of 10 cm (height), 20 cm (width) and 30 cm (depth), and provided with electrically heated wires at intervals of 20 cm in the width direction. After calcining, a switch of the heater was turned off, and the alumina boat was naturally cooled as it was left standing in the furnace. As a result, the temperature of the furnace decreased to about 200° C. after 5 hours, but the subsequent temperature fall rate was slightly mild. After elapse of a whole day and night, the pellet was taken out after confirming that the temperature of the furnace was 100° C. or lower, and milled by an automatic mortar made of agate for several minutes for leveling the particle size. In this way, a lithium transition metal composite oxide $Li_{1.13}Co_{0.11}Ni_{0.17}Mn_{0.59}O_2$ of a starting material which contains 2000 ppm of Na and has D50 of 5 μm was prepared.

<Acid Treatment Step>

The lithium transition metal composite oxide of a starting material (5.00 g) was added to a 0.05 M sulfuric acid aqueous solution (200 ml), the resulting mixture was stirred at a rotation speed of 400 rpm at room temperature for 30 seconds to perform acid treatment, and the acid-treated lithium transition metal composite oxide was separated by filtration and washed with water. Thereafter, the lithium transition metal composite oxide was dried overnight at 80° C. in a thermostat bath to prepare a lithium transition metal composite oxide (acid-treated sample) according to Comparative Example 14.

<Measurement of Pore Volume Distribution>

Pore-volume distributions of the lithium transition metal composite oxides of all Examples and Comparative Examples were measured according to the following conditions and procedure. For measurement of the pore-volume distribution, "autosorb iQ" and control/analysis software "ASiQwin" manufactured by Quantachrome Instruments Corporate were used. The lithium transition metal composite oxide (1.00 g) which is a sample of a measuring object was put in a sample tube for measurement, and dried in a vacuum at 120° C. for 12 hours, and thereby, a water content in the sample to be measured was adequately removed. Next, isotherms on an adsorption side and on a desorption side were measured within a relative pressure P/P0 (P0 is about 770 mmHg) range of 0 to 1 by the nitrogen gas adsorption method using liquid nitrogen. Then, the pore distribution was evaluated by calculating by the BJH method using the isotherms on a desorption side.

In the lithium transition metal composite oxides of all Examples and Comparative Examples, the pore size, at which a differential pore volume determined by a BJH method from an adsorption isotherm using a nitrogen gas adsorption method exhibits a maximum value, was within a range up to 60 nm.

<Measurement of Half Width>

The lithium transition metal composite oxides of all Examples and Comparative Examples were subjected to X-ray diffraction measurement according to the following conditions and procedure to determine the half width. Powder X-ray diffraction measurement was carried out using an X-ray diffractometer (manufactured by Rigaku Corporation, Model: MiniFlex II). The radiation source was CuKα, and the acceleration voltage and current were 30 kV and 15 mA, respectively. A sampling width was 0.01 degrees, a scanning time was 14 minutes (scanning speed: 5.0), a divergence slit width was 0.625 degrees, a light receiving slit width was open, and a scattering slit was 8.0 mm. With respect to the obtained X-ray diffraction data, using "PDXL", attached software of the X-ray diffractometer, the half width of the diffraction peak present at $2\theta=18°\pm1°$ in the X-ray diffraction pattern was determined without removing a peak derived from Kα2.

Incidentally, in X-ray diffraction measurement of the lithium transition metal composite oxide, a value of the half widths of the diffraction peak belonging to the (003) plane is basically maintained after undergoing charge-discharge. However, the positive active material can be partially cracked due to a press step in preparing an electrode, and therefore when the positive active material is obtained from the positive electrode included in a battery and a half width of a lithium transition metal composite oxide contained in the positive active material is measured, it is necessary to note so as not to include the positive active material in which cracks are produced.

<Evaluation of Structural Stability after Acid Treatment>

Structural stability of all Examples and Comparative Examples was investigated by subjecting the lithium transition metal composite oxides to X-ray diffraction measurement according to the following procedure and conditions. Each acid-treated sample (1 g) was placed in an alumina boat, the boat was placed in a box-type electric furnace (model: AMF 20), a temperature was elevated from ordinary temperature to 1000° C. over 3 hours and 20 minutes under normal pressure in an air atmosphere, and the sample was held at 1000° C. for 10 minutes. Powder X-ray diffraction measurement was carried out using an X-ray diffractometer (manufactured by Rigaku Corporation, Model: MiniFlex II). The radiation source was CuKα, and the acceleration voltage and current were 30 kV and 15 mA, respectively. A sampling width was 0.01 degrees, a scanning time was 14 minutes (scanning speed: 5.0), a divergence slit width was 0.625 degrees, a light receiving slit width was open, and a scattering slit was 8.0 mm. In regard to the obtained X-ray diffraction data, the sample in which a diffraction peak resulting from $LiMn_2O_4$ was not observed, was rated as "stable in a structure (exhibiting a single phase belonging to a space group R3-m)", and the sample in which a diffraction peak resulting from $LiMn_2O_4$ was observed, was rated as "unstable in a structure (not exhibiting a single phase belonging to a space group R3-m)". Evaluation results are shown in Table 1 denoting one "stable in a structure" by a symbol "o", and one "unstable in a structure" by a symbol "x".

<Preparation and Evaluation of Lithium Secondary Battery>

A lithium secondary battery was prepared according to the following procedure using each of the lithium transition metal composite oxides of all Examples and Comparative Examples as a positive active material for a lithium secondary battery, and battery performance thereof were evaluated.

A paste for application was prepared in which the active material, acetylene black (AB) and polyvinylidene fluoride (PVdF) were kneaded in a mass ratio of 90:4:6 and dispersed with N-methylpyrrolidone as a dispersion medium. The application paste was applied onto one surface of an aluminum foil current collector having a thickness of 20 µm and underwent a drying step and a press step to prepare a positive electrode plate. Incidentally, the mass and coating thickness of the active material applied per fixed area were equalized so that test conditions were the same among the lithium secondary batteries of all Examples and Comparative Examples.

For the purpose of accurately observing the independent behavior of a positive electrode, metallic lithium was brought into close contact with a nickel foil current collector and used for a counter electrode, i.e. a negative electrode. Here, a sufficient amount of metallic lithium was placed on the negative electrode so that the capacity of the lithium secondary battery was not limited by the negative electrode.

As an electrolyte solution, a solution obtained by dissolving $LiPF_6$, so as to be 1 mol/l in concentration, in a mixed solvent of ethylene carbonate (EC)/ethylmethyl carbonate (EMC)/dimethyl carbonate (DMC) in a volume ratio of 6:7:7, was used. As a separator, a microporous membrane made of polypropylene, the surface of which was modified with polyacrylate, was used. As a casing body, a metal resin composite film made of polyethylene terephthalate (15 µm)/aluminum foil (50 µm)/metal-adhesive polypropylene film (50 µm) was used, the electrode was housed such that the open ends of a positive electrode terminal and a negative electrode terminal were externally exposed, fusion margins with the inner surfaces of the aforementioned metal resin composite films facing each other were airtightly sealed except a portion forming an electrolyte solution filling hole, and the electrolyte solution was injected, followed by sealing the electrolyte solution filling hole.

The lithium secondary battery prepared in the procedure described above was subjected to an initial charge-discharge step at 25° C. Charge was constant current constant voltage charge with a current of 0.1 CA and a voltage of 4.6 V, and the condition of the end-of-charge was set at a time point at which the current value was reduced to one-sixth. Discharge was constant current discharge with a current of 0.1 CA and an end voltage of 2.0 V. This charge-discharge cycle was carried out 2 times. Here, a rest step of 30 minutes was provided each after charge and after discharge.

Next, a charge voltage was changed and a charge-discharge test of one cycle was carried out. The voltage control was all performed for a positive electrode potential. With respect to conditions of the charge-discharge test, charge was carried out at a constant current constant voltage charge with a current of 0.1 CA and a voltage of 4.3 V, and the condition of the end-of-charge was set at a time point at which the current value was reduced to one-sixth. Discharge was constant current discharge with a current of 1 CA and an end voltage of 2.0 V. A discharge electrical quantity at this time was recorded as "discharge capacity (mAh/g)" (in Table, denoted by "1C capa").

Test results of powder properties of the lithium transition metal composite oxides of all Examples and Comparative Examples, and lithium secondary battery including each of the lithium transition metal composite oxides as a positive active material for a lithium secondary battery, are shown in Table 1.

TABLE 1

| | Li/Me | Synthesis Temperature/ ° C. | Acid Treatment Time/ second | Pore Volume/ cc g$^{-1}$ | Retention of Structure after Acid Treatment | Half Width/° | Initial Efficiency/% | 1 C Capacity/ mAh g$^{-1}$ |
|---|---|---|---|---|---|---|---|---|
| Example 1 | 1.39 | 850 | 30 | 0.060 | ○ | 0.227 | 95 | 201 |
| Example 2 | 1.36 | 850 | 60 | 0.064 | ○ | 0.229 | 96 | 200 |
| Example 3 | 1.39 | 800 | 30 | 0.075 | ○ | 0.263 | 96 | 195 |
| Example 4 | 1.36 | 800 | 60 | 0.078 | ○ | 0.265 | 98 | 194 |
| Example 5 | 1.39 | 900 | 30 | 0.055 | ○ | 0.206 | 92 | 195 |
| Example 6 | 1.36 | 900 | 60 | 0.058 | ○ | 0.207 | 93 | 194 |
| Example 7 | 1.28 | 850 | 30 | 0.072 | ○ | 0.242 | 97 | 194 |
| Example 8 | 1.22 | 850 | 60 | 0.073 | ○ | 0.243 | 98 | 194 |
| Example 9 | 1.55 | 850 | 30 | 0.055 | ○ | 0.202 | 91 | 192 |
| Example 10 | 1.48 | 850 | 60 | 0.056 | ○ | 0.203 | 92 | 192 |
| Comparative Example 1 | 1.43 | 850 | 0 | 0.053 | ○ | 0.236 | 90 | 188 |
| Comparative Example 2 | 1.33 | 850 | 180 | 0.069 | X | 0.230 | 98 | 179 |
| Comparative Example 3 | 1.31 | 850 | 600 | 0.072 | X | 0.231 | 100 | 174 |
| Comparative Example 4 | 1.39 | 750 | 30 | 0.086 | ○ | 0.310 | 95 | 168 |
| Comparative Example 5 | 1.36 | 750 | 60 | 0.088 | ○ | 0.312 | 96 | 166 |
| Comparative Example 6 | 1.39 | 950 | 30 | 0.037 | ○ | 0.185 | 85 | 155 |
| Comparative Example 7 | 1.36 | 950 | 60 | 0.038 | ○ | 0.187 | 86 | 154 |
| Comparative Example 8 | 1.18 | 900 | 30 | 0.059 | ○ | 0.233 | 96 | 175 |
| Comparative Example 9 | 1.16 | 900 | 60 | 0.061 | ○ | 0.235 | 97 | 174 |
| Comparative Example 10 | 1.64 | 800 | 30 | 0.062 | ○ | 0.236 | 85 | 172 |
| Comparative Example 11 | 1.61 | 800 | 60 | 0.064 | ○ | 0.239 | 86 | 172 |

TABLE 1-continued

|  | Li/Me | Synthesis Temperature/ ° C. | Acid Treatment Time/ second | Pore Volume/ cc g$^{-1}$ | Retention of Structure after Acid Treatment | Half Width/° | Initial Efficiency/% | 1 C Capacity/ mAh g$^{-1}$ |
|---|---|---|---|---|---|---|---|---|
| Comparative Example 12 | 1.39 | 850 | 30 | 0.061 | X | 0.226 | 94 | 178 |
| Comparative Example 13 | 1.36 | 850 | 60 | 0.064 | X | 0.228 | 95 | 177 |
| Comparative Example 14 | 1.48 | 1000 | 30 | 0.015 | ◯ | 0.199 | 84 | 152 |

From Table 1, it is found that the positive active material including a lithium transition metal composite oxide has excellent initial efficiency higher than 90%, the lithium transition metal composite oxide having a molar ratio Li/Me after acid treatment larger than 1.2 and smaller than 1.6; having a pore volume of 0.055 cc/g or more within a range where a pore size, at which a differential pore volume determined by a BJH method from an adsorption isotherm using a nitrogen gas adsorption method exhibits a maximum value, is up to 60 nm (pore region up to 60 nm); having a half width of the diffraction peak belonging to the (003) plane in X-ray diffraction measurement of within a range of 0.202° to 0.265°; and further exhibiting a single phase belonging to a space group R3-m when being heat-treated at 1000° C. (symbol "o"; a crystal structure before acid treatment remains), and it is found that a 1C capacity is as high as 190 mAh/g or more and therefore high rate discharge performance is excellent (refer to Examples 1 to 10).

On the other hand, in the active material having a molar ratio Li/Me of the lithium transition metal composite oxide of 1.2 or less, the high rate discharge performance is deteriorated (Comparative Examples 8, 9), and in the active material having a molar ratio Li/Me of 1.6 or more, the initial efficiency and the high rate discharge performance are deteriorated (Comparative Examples 10, 11). In the active material not subjected to acid treatment, the pore volume is less than 0.055 cc/g, and the initial efficiency and the high rate discharge performance are low (refer to Comparative Example 1). In the active material having undergone a high calcination temperature and the active material produced with the hydroxide precursor, the pore volume is less than 0.055 cc/g and the half width is less than 0.202°, and the initial efficiency and the high rate discharge performance are deteriorated (refer to Comparative Examples 6, 7 and 14). The active material having undergone a long acid treatment time and the active material having undergone acid treatment with nitric acid do not exhibit a single phase belonging to a space group R3-m (x: the crystal structure before acid treatment collapses) when heat-treated at 1000° C., and the high rate discharge performance is deteriorated (refer to Comparative Examples 2, 3, 12 and 13). In the active material having undergone a low calcination temperature, the half width exceeded 0.265°, deteriorating the high rate discharge performance (refer to Comparative Examples 4 and 5).

Incidentally, a value of the molar ratio Li/Me of the lithium transition metal composite oxide increases and decreases by charge and discharge, and therefore when the positive active material is obtained from the positive electrode included in a battery and the value of the molar ratio Li/Me of the lithium transition metal composite oxide contained in the positive active material is determined, it is necessary to obtain the positive active material after the positive electrode is brought into an end of discharge. Specifically, the following procedure is employed. At first, the positive electrode is taken out of a battery. In this time, it is preferred for safety to take out the positive electrode after a battery is brought into an end of discharge. Next, using a nonaqueous electrolyte equal in composition to that used in the battery, a cell including metal lithium as a counter electrode is assembled. Setting a charge voltage to 4.3 V, constant current charge of the cell is performed at a current of 0.1 CmA, a rest of 30 minutes is provided, and then constant current discharge is performed up to 2.0 V at a current of 0.1 CmA or less to bring the positive electrode into an end of discharge. The positive electrode is taken out of the cell and adequately cleaned using dimethylcarbonate, and dried at room temperature all night and all day, and a composite is taken out of the electrode and the positive active material is collected. A value of the molar ratio Li/Me of the lithium transition metal composite oxide contained in the positive active material thus adjusted to a state of an end of discharge is returned to such a level that the value of the molar ratio Li/Me of the lithium transition metal composite oxide contained in the positive active material which is used as a raw material is reduced by about 3%.

INDUSTRIAL APPLICABILITY

Since it is possible to provide a lithium secondary battery having high initial efficiency and excellent high rate discharge performance by using the positive active material containing an inventive lithium transition metal composite oxide of the present invention, the lithium secondary battery is useful as a lithium secondary battery for a hybrid automobile and an electric automobile.

The invention claimed is:
1. A positive active material for a lithium secondary battery containing a lithium transition metal composite oxide, wherein the lithium transition metal composite oxide has an α-NaFeO$_2$ structure, transition metals (Me) include Co, Ni and Mn and a molar ratio Li/Me of lithium (Li) to the transition metal is larger than 1.2 and smaller than 1.6, the lithium transition metal composite oxide has a pore volume of 0.055 to 0.08 cc/g in a pore region where a pore size, at which a differential pore volume determined by a BJH (Barrett-Joyner-Halenda) method from an adsorption isotherm using a nitrogen gas adsorption method exhibits a maximum value, is within a range up to 60 nm, and the lithium transition metal composite oxide exhibits a single phase belonging to a space group R3-m at 1000° C.

2. The positive active material for a lithium secondary battery according to claim 1, wherein in the lithium transition metal composite oxide, a half width of the diffraction peak belonging to the (003) plane in X-ray diffraction measurement is within a range of 0.202° to 0.265°.

3. The positive active material for a lithium secondary battery according to claim 1, wherein a molar ratio of Mn to the transition metal element Me (Mn/Me) is 0.5 or more.

4. The positive active material for a lithium secondary battery according to claim 1, wherein a molar ratio of Mn to the transition metal element Me (Mn/Me) is 0.5 or more and 0.75 or less.

5. The positive active material for a lithium secondary battery according to claim 1, wherein a molar ratio of Co to the transition metal element Me (Co/Me) is 0.05 or more and 0.40 or less.

6. The positive active material for a lithium secondary battery according to claim 1, wherein a molar ratio of Co to the transition metal element Me (Co/Me) is 0.10 or more and 0.30 or less.

7. An electrode for a lithium secondary battery containing the positive active material for a lithium secondary battery according to claim 1.

8. A lithium secondary battery comprising the electrode for a lithium secondary battery according to claim 7.

9. A method for producing the positive active material for a lithium secondary battery according to claim 1, wherein the lithium transition metal composite oxide is prepared by undergoing a precursor preparation step of preparing a precursor containing Co, Ni and Mn as transition metal elements; a calcination step of mixing the precursor and a Li salt and heat-treating the resulting mixture at a temperature of 800° C. or higher to prepare an oxide; and an acid treatment step of acid-treating the oxide.

10. The method for producing the positive active material for a lithium secondary battery according to claim 9, wherein the precursor is a carbonate compound.

11. The method for producing the positive active material for a lithium secondary battery according to claim 10, wherein in the calcination step, heat treatment is performed at a temperature of 800° C. or higher and 900° C. or lower.

12. The method for producing the positive active material for a lithium secondary battery according to claim 9, wherein the precursor preparation step includes a step of coprecipitating a carbonate from an aqueous solution with a pH of 7.5 to 11 including Co, Ni and Mn.

13. The method for producing the positive active material for a lithium secondary battery according to claim 9, wherein in the acid treatment step, sulfuric acid is used.

* * * * *